US012596246B2

(12) United States Patent
Sun et al.

(10) Patent No.: US 12,596,246 B2
(45) Date of Patent: Apr. 7, 2026

(54) OPTICAL SYSTEM AND HEAD MOUNTED DISPLAY

(71) Applicant: GOERTEK OPTICAL TECHNOLOGY CO., LTD, Shandong (CN)

(72) Inventors: Qi Sun, Shandong (CN); Bogang Zhao, Shandong (CN)

(73) Assignee: GOERTEK OPTICAL TECHNOLOGY CO., LTD, Shandong (CN)

( * ) Notice: Subject to any disclaimer, the term of this patent is extended or adjusted under 35 U.S.C. 154(b) by 388 days.

(21) Appl. No.: 18/247,047

(22) PCT Filed: Dec. 21, 2021

(86) PCT No.: PCT/CN2021/140023
§ 371 (c)(1),
(2) Date: Mar. 28, 2023

(87) PCT Pub. No.: WO2023/097813
PCT Pub. Date: Jun. 8, 2023

(65) Prior Publication Data
US 2024/0184094 A1 Jun. 6, 2024

(30) Foreign Application Priority Data

Nov. 30, 2021 (CN) .......................... 202111445295.X

(51) Int. Cl.
*G02B 25/00* (2006.01)
*G02B 3/08* (2006.01)

(52) U.S. Cl.
CPC ............. *G02B 25/001* (2013.01); *G02B 3/08* (2013.01)

(58) Field of Classification Search
CPC ................................ G02B 25/001; G02B 3/08
USPC ..................................................... 359/643, 742
See application file for complete search history.

(56) References Cited

U.S. PATENT DOCUMENTS

| | | | |
|---|---|---|---|
| 2017/0248769 A1 | 8/2017 | Stamenov | |
| 2019/0072763 A1 | 3/2019 | Matsumoto et al. | |
| 2021/0157122 A1 | 5/2021 | Cao et al. | |
| 2021/0199967 A1 | 7/2021 | Takagi | |
| 2021/0302627 A1 | 9/2021 | Suzuki et al. | |

FOREIGN PATENT DOCUMENTS

| | | |
|---|---|---|
| CN | 104536129 A | 4/2015 |
| CN | 106291939 A | 1/2017 |
| CN | 106338820 A | 1/2017 |

(Continued)

*Primary Examiner* — William Choi
(74) *Attorney, Agent, or Firm* — Ingrassia Fisher & Lorenz, LLP

(57) ABSTRACT

An optical system and a head mounted display are disclosed. The optical system comprises: a third lens, a second lens and a first lens arranged successively along a propagation direction of incident light. There are three Fresnel surfaces in the optical system, and two of the Fresnel surfaces are arranged adjacent to each other. The third lens has a positive focal power. A field of view of the optical system is ≥100 degrees. The present disclosure provides a solution of optical structure with short-focus, high light efficiency and large FOV. The optical system according to the present disclosure can be applied in, for example, a head mounted display.

17 Claims, 9 Drawing Sheets

(56) References Cited

FOREIGN PATENT DOCUMENTS

| | | | |
|---|---|---|---|
| CN | 108474935 | A | 8/2018 |
| CN | 110824712 | A | 2/2020 |
| CN | 210835439 | U | 6/2020 |
| CN | 211506040 | U | 9/2020 |
| CN | 112630973 | A | 4/2021 |
| CN | 112630977 | A | 4/2021 |
| CN | 213843671 | U | 7/2021 |
| JP | 2017211474 | A | 11/2017 |
| JP | 2017211475 | A | 11/2017 |
| JP | 2020013106 | A | 1/2020 |
| WO | WO-2020012817 | A1 * | 1/2020 ............ G02B 25/00 |

* cited by examiner

OPTICAL SYSTEM AND HEAD MOUNTED DISPLAY

CROSS-REFERENCE TO RELATED APPLICATIONS

This application is a U.S. National-Stage entry under 35 U.S.C. § 371 based on International Application No. PCT/CN2021/140023, filed Dec. 21, 2021 which was published under PCT Article 21(2) and which claims priority to Chinese Application No. 202111445295.X, filed Nov. 30, 2021, which are all hereby incorporated herein in their entirety by reference. This application claims priority to Chinese patent application No. 202111445295.X filed with the China Patent Office on Nov. 30, 2021 and entitled "Optical System and Head Mounted Display", which is incorporated by reference herein in its entirety.

TECHNICAL FIELD

This application pertains to the technical field of optical imaging, more specifically, it relates to an optical system and a head mounted display.

BACKGROUND

In recent years, augmented reality (AR) technology and virtual reality (VR) technology have been applied in intelligent wearable devices and developed rapidly. The core component of both the augmented reality technology and the virtual reality technology is the display optical system. The display effect of the display optical system will directly determine the quality of intelligent wearable devices.

In the prior art, take VR devices as an example, in the current VR device, if large field of view (FOV) and short total optical length are realized based on a 1.4 inch display screen, the conventional solution is a folded optical path structure, but it has the problems such as high production cost, low light efficiency (<25%) and ghosting. In addition, other objects, desirable features and characteristics will become apparent from the subsequent summary and detailed description, and the appended claims, taken in conjunction with the accompanying drawings and this background.

SUMMARY

The object of the present disclosure is to provide a new technical solution of an optical system and a head mounted display.

According to an aspect of the present disclosure, an optical system is provided. The optical system comprises:

a third lens, a second lens and a first lens arranged successively along a propagation direction of incident light;

wherein there are three Fresnel surfaces in the optical system, and two of the Fresnel surfaces are arranged adjacent to each other;

the third lens has a positive focal power; and a field of view of the optical system is ≥100 degrees.

Optionally, the first lens and the second lens both have positive focal powers, and the first lens, the second lens and the third lens are located on a same optical axis.

Optionally, two adjacent surfaces of the first lens and the second lens are Fresnel surfaces.

Optionally, the first lens comprises a first surface and a second surface, and the second lens comprises a third surface and a fourth surface;

the second surface and the third surface are arranged adjacent to each other and are both set as Fresnel surfaces; and the first surface and the fourth surface are both aspherical surfaces.

Optionally, the third lens comprises a fifth surface and a sixth surface;

one of the fifth surface and the sixth surface is a Fresnel surface, and the other of the fifth surface and the sixth surface is an aspherical surface; and the Fresnel surface of the third lens and the fourth surface of the second lens are arranged adjacent to each other.

Optionally, a first spacing T1 is provided between the first lens and the second lens, and the first spacing T1 is set to 0.2 mm≤T1≤1 mm.

Optionally, a second spacing T2 is provided between the second lens and the third lens, and the second spacing T2 is set to 1 mm≤T2≤3 mm.

Optionally, an effective focal length f1 of the first lens is 30 mm≤f1≤40 mm;

an effective focal length f2 of the second lens is 40 mm≤f2≤460 mm; and an effective focal length f3 of the third lens is 65 mm≤f3≤115 mm.

Optionally, the first lens, the second lens and the third lens are made of COP materials, OKP materials, EP materials or PMMA materials.

According to another aspect of the present disclosure, a head mounted display is provided. The head mounted display comprises an optical system as described above.

The beneficial effects of the present disclosure are as follows.

The embodiments of the present disclosure provide a solution of direct transmission optical structure, in which three optical lenses are used, and three Fresnel surfaces are designed in the optical path structure, which can not only provide strong convergence ability and thus reduces the total optical length of the optical system and increases the field of view FOV, but also make the optical efficiency of the optical system reach a higher level. The two Fresnel surfaces are arranged adjacent to each other, which facilitates reducing stray light. The solution according to an embodiments of the present disclosure realizes the optical design requirements of short-focus, high light efficiency and large FOV. The optical system obtained can be applied in, for example, head mounted displays (such as VR devices), and facilitates the miniaturization and lightweight of head mounted displays.

By the following detailed description of the exemplary embodiments of the present disclosure with reference to the accompanying drawings, other features and advantages of the present disclosure will become clear.

BRIEF DESCRIPTION OF DRAWINGS

The present invention will hereinafter be described in conjunction with the following drawing figures, wherein like numerals denote like elements, and.

Figure 1:
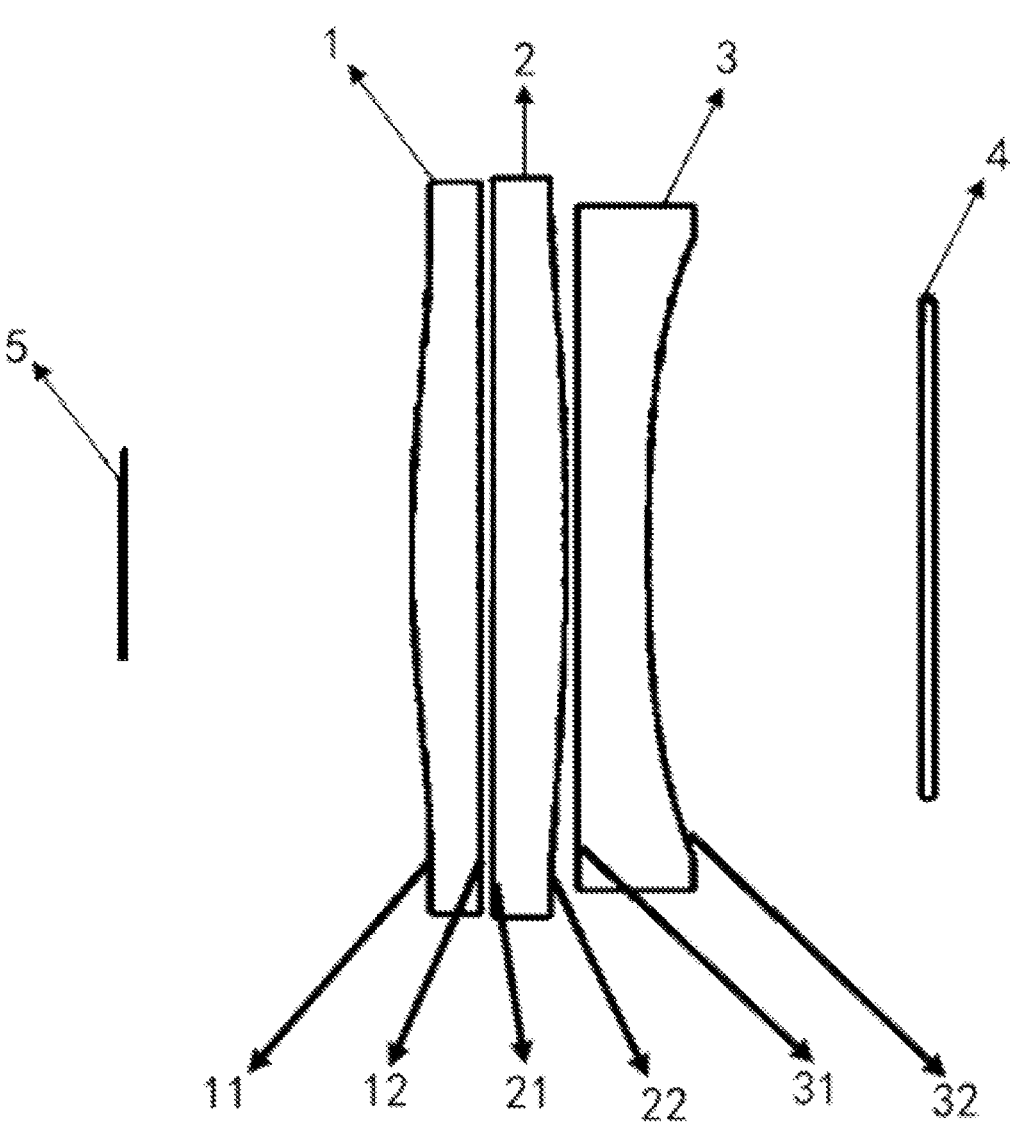
FIG. 1 is a schematic diagram of the structure of an optical system according to an embodiment of the present disclosure.

In the drawings: 1. first lens; 2. second lens; 3. third lens; 4. display screen; 5. human eye; 11. first surface; 12. second surface; 21. third surface; 22. fourth surface; 31. fifth surface; 32. sixth surface.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The technical solutions in embodiments of the present disclosure will be described clearly and completely below with reference to the drawings in the embodiments of the present disclosure. Obviously, the embodiments as described below are merely part of, rather than all, embodiments of the present disclosure. Based on the embodiments of the present disclosure, any other embodiment obtained by a person of ordinary skill in the art without paying any creative effort shall fall within the protection scope of the present disclosure.

The following description of at least one exemplary embodiment is in fact only illustrative, and in no way serves as any restriction on the present disclosure and its application or use.

The techniques, methods and equipment known to a person of ordinary skill in the art may not be discussed in detail, but in appropriate cases, these techniques, methods and equipment shall be considered as a part of the specification.

In all the examples shown and discussed herein, any specific value should be interpreted as merely illustrative and not as a limitation. Therefore, other examples of the exemplary embodiments may have different values.

It should be noted that similar reference numerals and letters denote similar items in the following drawings. Therefore, once an item is defined in one drawing, it does not need to be further discussed in the subsequent drawings.

The optical systems and the head mounted displays according to embodiments of the present disclosure will be described in detail below with reference to FIGS. 1 to 9.

According to an aspect of the present disclosure, an optical system is provided. The optical system is a short-focus, high light efficiency, large FOV, direct transmission optical system, which is suitable for application in electronic devices, for example, head mounted displays (HMD) such as VR devices (such as VR glasses or VR helmets). It has a good application prospect.

Figure 2:
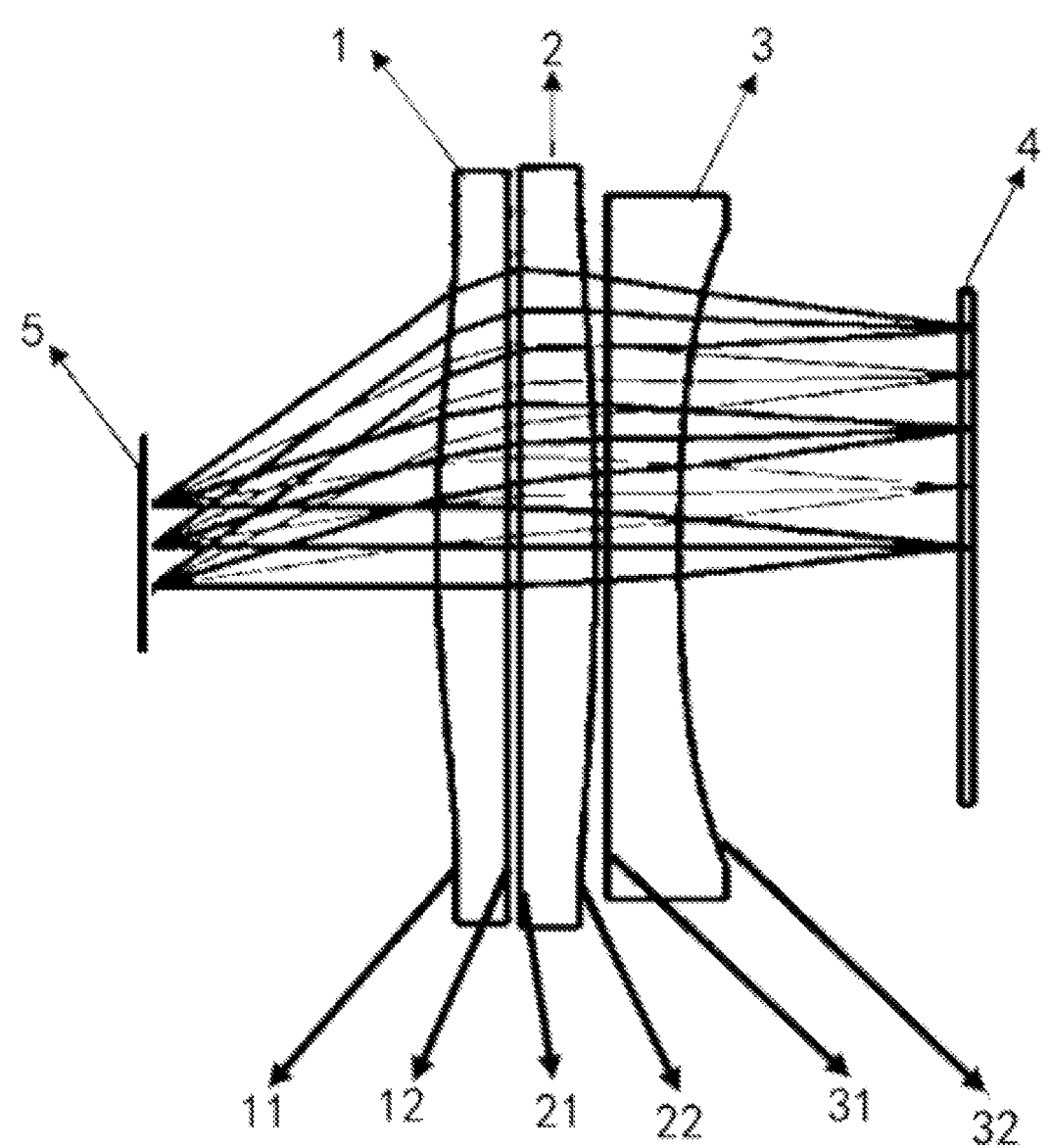
FIG. 2 is a schematic diagram of the imaging principle of an optical system according to an embodiment of the present disclosure.

The optical system according to an embodiment of the present disclosure, as shown in FIGS. 1 and 2, comprises a third lens 3, a second lens 2 and a first lens 1 arranged successively along the propagation direction of the incident light.

There are three Fresnel surfaces in the optical system, and two of the Fresnel surfaces are arranged adjacent to each other.

The third lens 3 has a positive focal power.

A field of view of the optical system is ≥100 degrees.

The optical system according to the embodiment of the present disclosure is designed as a direct transmission optical path structure. The design of optical path structure is relatively simple and thus is easy to make.

It should be noted that the optical system may also comprise a display screen 4.

In the optical path structure, the display screen 4 can be used to emit light, i.e., to provide incident light for the optical system.

That is to say, in the optical system according to the embodiment of the present disclosure, a lens combination is designed and used, which comprises, for example, three optical lenses, as shown in FIGS. 1 and 2. The lens combination is arranged at a light exit side of the display screen 4 (specifically, in the propagation direction of the incident light emitted from the display screen 4), and can be used to project the incident light into the human eye 5 for imaging, thereby realizing the imaging function of the optical system.

As shown in FIG. 1 and FIG. 2, the optical system according to the embodiment of the present disclosure is based on the combination of three optical lenses, namely, the combination of the first lens 1, the second lens 2 and the third lens 3. Moreover, the surface shape combinations of the three lenses are all designed as Fresnel surface+aspherical surface. The three Fresnel surfaces in the optical path structure can provide a large focal power and realize ultra-short-focus, and the provision of two adjacent Fresnel surfaces facilitates reducing stray light. Moreover, by reasonably setting the surface shape of the third lens 3, it facilitates realizing high resolution and low dispersion.

It should be noted that in the solution according to the embodiment of the present disclosure, the Fresnel surfaces of the first lens 1, the second lens 2 and the third lens 3 include but are not limited to a flat base.

That is to say, the Fresnel surfaces of the first lens 1, the second lens 2 and the third lens 3 may also have a curved base. Those skilled in the art can adjust the base type of the Fresnel surface according to the specific situation, and the present disclosure has no particular limitation herein. When a curved base is used, the lens can be thinner.

The embodiment of the present disclosure provides a solution of direct transmission optical structure, in which three optical lenses are used, and three Fresnel surfaces are designed in the optical path structure, which can not only provide strong convergence ability and thus reduces the total optical length TTL of the optical system and increases the field of view FOV, but also make the optical efficiency of the optical system reach a high level. The two Fresnel surfaces are arranged adjacent to each other, which facilitates reducing stray light.

The solution according to an embodiments of the present disclosure realizes the optical design requirements of short-focus, high light efficiency and large FOV. The optical system obtained can be applied in, for example, head mounted displays (such as VR devices), and facilitates the miniaturization and lightweight of head mounted displays.

In sum, the optical path solution according to the embodiment of the present disclosure overcomes the problems caused by the conventional solution of one-piece lens plus display screen, i.e., the lens is far away from the display screen, which leads to the larger size of the VR device and is not conducive to the miniaturization of the product.

At the same time, it can also overcome the defects caused by using folded optical path. The folded optical path solution has the disadvantages of high cost, low light efficiency and ghosting. The solution according to the embodiment of the present disclosure adopts a direct transmission optical solution, which can not only provide strong convergence ability (focal power) and thus reduces the total optical length of the optical system and increases the field of view FOV, but also improve the optical efficiency and make it reach a high level.

For example, as shown in FIGS. 1 and 2, the optical system is provided with a display screen 4. The display screen 4 is, for example, a 1.4 inch display which realizes a 100 degree field of view. On this basis, the conventional one-piece lens (1P) structure or two-piece lens (2P) structure is not enough to distinguish this type of display screen. The reason is as follows.

The one-piece lens (1P) structure only has two surfaces for optimization of surface freedom, its convergence ability is limited, and the aberration or chromatic aberration cannot be corrected. The pixel size (i.e., spot size) that can be distinguished in the full field of view is about 80 μm to 100 μm. More importantly, it cannot realize short-focus.

The two-piece lens (2P) structure increases the surface freedom of lens surface for optimization and can realize short-focus, but it still has the limitation of resolution. Its pixel size (i.e., spot size) that can be distinguished in the full field of view is about 60 μm to 80 μm.

The combined structure of optical lenses adopted in the embodiment of the present disclosure can further improve the resolution, and can correct the chromatic aberration to a certain extent. What is formed is a direct transmission and short-focus optical path structure, in which the cooperation of three Fresnel surfaces can provide a large focal power, and the third lens 3 on the side close to the display screen 4 can be used to eliminate chromatic aberration, which facilitates improving the imaging quality.

In addition, it should be noted that the optical system according to the embodiment of the present disclosure is not limited to providing only three Fresnel surfaces. The optical system may further comprise more lenses, and more Fresnel surfaces are provided in the optical path structure, which can be flexibly adjusted by those skilled in the art according to specific conditions.

In some examples of the present disclosure, the first lens 1 and the second lens 2 both have positive focal powers; the first lens 1, the second lens 2 and the third lens 3 are located on the same optical axis.

The three lenses according to the embodiment of the present disclosure are all designed as positive lenses.

As shown in FIG. 2, the light emitted from the display screen 4 enters the second lens 2 (a positive lens) as the incident light after passing through the third lens 3 (a positive lens). The incident light converges after passing through the second lens 2, and then enters the first lens 1. The first lens 1 is also a converging positive lens. After passing through the first lens 1, the light enters the human eye 5 for imaging. There is no optical path folding in the entire optical system, and it is a direct transmission optical path structure.

In some examples of the present disclosure, as shown in FIGS. 1 and 2, the two adjacent faces of the first lens 1 and the second lens 2 are Fresnel faces. It facilitates reducing stray light by using such a design in the optical system.

In some examples of the present disclosure, as shown in FIGS. 1 and 2, the first lens 1 comprises a first surface 11 and a second surface 12, and the second lens 2 comprises a third surface 21 and a fourth surface 22.

The second surface 12 and the third surface 21 are arranged adjacent to each other, and are both Fresnel surfaces.

The first surface 11 and the fourth surface 22 are both aspherical surfaces.

In the optical system according to the embodiment of the present disclosure, as shown in FIGS. 1 and 2, the first surface 11 of the first lens 1 directly faces the human eye 5 and is located externally. The first surface 11 is set as an aspherical surface (further, the first surface 11 is a convex surface), for example. The second surface 12 of the first lens 1 is set as a Fresnel surface. In this way, the first lens 1 (a positive lens) has a combined surface shape of two surface shapes: aspherical surface+Fresnel surface.

Optionally, the first surface 11 and the second surface 12 of the first lens 1 are respectively plated with an anti-reflection (AR) film.

After the two surfaces of the first lens 1 are respectively plated with an anti-reflection film, the reflected light can be reduced by the anti-reflection films, thereby increasing the transmissivity of light on the two surfaces of the first lens 1.

Optionally, the first surface 11 of the first lens 1 may be plated with a hardened film in addition to the anti-reflection film.

The reason is that the first surface 11 of the first lens 1 faces outward and needs to avoid scratches, collisions and other damages. The service life of the first lens 1 can be improved by plating the hardened film. The hardness, strength, etc. of the first surface 11 can be improved by plating the hardened film on the first surface 11 (i.e., hardening the first surface 11). This is beneficial to improve the service life of the entire optical system.

Of course, in the embodiments of the present disclosure, it is not limited to the first surface 11 of the first lens 1 that is plated with a hardened film, the second surface 12 of the first lens 1 may also be plated with a hardened film. Those skilled in the art can flexibly adjust according to specific needs, and the present disclosure has no particular limitation herein.

In addition, in the embodiment of the present disclosure, the first lens 1 may further have the following parameters.

In some examples of the present disclosure, the absolute value of the radius $R_1$ of the first surface 11 of the first lens 1 satisfies 50 mm≤Abs $(R_1)$≤80 mm; the absolute value of the radius $R_2$ of the second surface 12 of the first lens 1 satisfies 25 mm≤Abs $(R_2)$≤30 mm; the absolute value of the conic constant $K_1$ of the first surface 11 and the second surface 12 satisfies Abs $(K_1)$≤10.

The surface shape of the first surface 11 is different from that of the second surface 12.

Specifically, the first surface 11 facing outward is designed as an aspherical surface (such as a convex surface), while the second surface 12 is designed as a Fresnel surface. When the first lens 1 formed by combining the Fresnel surface and the aspherical surface is used in the optical path structure, it facilitates realizing short-focus and high resolution.

In the embodiment of the present disclosure, after optimizing the surface shape of the first lens 1, if the processing difficulty and cost are considered, more preferably, the conic constant (i.e., $K_1$) of the first lens 1 is, for example, within

[−10, 10], and the radius R of the Fresnel surface of the first lens 1 is greater than 23 mm.

In some examples of the present disclosure, the second lens 2 and the first lens 1 may have the same combination form of surface shapes, and a narrow air gap is maintained between them.

For example, the third surface 21 of the second lens 2 is a Fresnel surface, and the fourth surface 22 of the second lens 2 is an aspherical surface (further, the fourth surface 11 is also a convex surface).

The second lens 2 is also a positive lens. It is located between the first lens 1 and the third lens 3, and is closer to the first lens 1.

Optionally, the third surface 21 and the fourth surface 22 of the second lens 2 are also plated with an anti-reflection film. The reflection light is reduced by the anti-reflection films, thereby increasing the transmissivity of light on the two surfaces of the second lens 2.

In addition, in the embodiment of the present disclosure, the second lens 2 may further have the following parameters.

In some examples of the present disclosure, the absolute value of the radius $R_3$ of the third surface 21 of the second lens 2 satisfies 25 mm≤Abs ($R_3$)≤30 mm; the absolute value of the radius $R_4$ of the fourth surface 22 of the second lens 2 satisfies Abs ($R_4$)≥120 mm; the absolute value of the conic constant $K_2$ of the third surface 21 and the fourth surface 22 satisfies Abs ($K_2$)≤10.

In the embodiment of the present disclosure, after optimizing the surface shape of the second lens 2, if the processing difficulty and cost are considered, more preferably, the conic constant (i.e., $K_2$) of the second lens 2 is, for example, within [−10, 10], and the radius R of the Fresnel surface of the second lens 2 is greater than 23 mm.

In some examples of the present disclosure, as shown in FIGS. 1 and 2, the third lens 3 comprises a fifth surface 31 and a sixth surface 32; one of the fifth surface 31 and the sixth surface 32 is a Fresnel surface, and the other of the fifth surface 31 and the sixth surface 32 is an aspherical surface; the Fresnel surface of the third lens 3 and the fourth surface 22 of the second lens 2 are arranged adjacent to each other.

Further, the fifth surface 31 is set as a Fresnel surface, and the sixth surface 32 is set as a concave surface. In this way, in the entire optical path structure, the surface adjacent to the fourth surface 22 of the second lens 2 is a Fresnel surface, while the surface adjacent to the display screen 4 is a concave surface. In the entire optical path structure, the third lens 3 can be used to eliminate chromatic aberration.

Optionally, the fifth surface 31 and the sixth surface 32 are both plated with an anti-reflection film.

After the two surfaces of the third lens 3 are respectively plated with an anti-reflection film, the reflection light can be reduced by the anti-reflection films to increase the transmissivity of light on the two surfaces of the third lens 3.

In the solution of the present disclosure, the optical system is optimized, in which two combinations of Fresnel surface+aspherical surface (convex surfaces) of the first lens 1 and the second lens 2, in cooperation with the combination of Fresnel surface+aspherical surface (concave surface) of the third lens 3, well realize short-focus, high light efficiency, low dispersion and large FOV.

In addition, in the embodiment of the present disclosure, the third lens 3 may further have the following parameters.

In some examples of the present disclosure, the absolute value of the radius $R_5$ of the fifth surface 31 of the third lens 3 satisfies 30 mm≤Abs ($R_5$)≤50 mm; the absolute value of the radius $R_6$ of the sixth surface 32 of the third lens 3 satisfies 110 mm≤Abs ($R_6$)≤170 mm; the absolute value of the conic constant $K_3$ of the fifth surface 31 and the sixth surface 32 satisfies Abs ($K_3$)≤10.

In the embodiment of the present disclosure, after optimizing the surface shape of the third lens 3, if the processing difficulty and cost are considered, more preferably, the conic constant (i.e., $K_3$) of the third lens 3 is, for example, within [−10, 10], and the radius of the Fresnel surface of the third lens 3 is greater than 23 mm.

It should be noted that the first lens 1, the second lens 2, and the third lens 3 all have Fresnel surfaces. Considering the processing of lens surface shape, it is necessary to set the surface parameter within a certain range, otherwise the processing accuracy will be low or the cutter may break (this is because the tooth shape processing is difficult, and if the acute angle of the tooth shape is smaller, the processing angle and action will be more difficult). Because of this, it is preferable to set the conic constant K within the range of [−10, 10], and the R value of the Fresnel surface of each lens is greater than 23 mm.

In the solution of the optical system according to an embodiment of the present disclosure, the first lens 1 and the second lens 2 both take the combination form of aspherical surface (convex surface)+Fresnel surface, the third lens 3 takes the combination form of aspherical (a concave surface)+Fresnel surface, and further based on the selection and cooperation of materials having different refractive indexes and Abbe numbers, low dispersion and high resolution of the optical path structure can be realized.

In the solution of the optical system according to the embodiment of the present disclosure, the optical system comprises: the display screen 4, and the first lens 1, the second lens 2 and the third lens 3. The display screen 4 acts as a display light source and can emit light. The light can enter the lens group as the incident light. The first lens 1 and the second lens 2 are both positive lenses, and both take the combination form of convex surface+Fresnel surface. The third lens 3 is also a positive lens, and is Fresnel surface+concave surface. The surfaces of the three lenses are all plated with an anti-reflection film, and the first surface 11 of the first lens 1 is plated with a hardened film and an anti-reflection film.

On this basis, as shown in FIG. 2, the incident light emitted from the display screen 4 passes through the sixth surface 32 (a concave surface) of the third lens 3 plated with an anti-reflection film, and enters the interior of the third lens 3. The light passing through the third lens 3 further enters the second lens 2. Two surfaces of the second lens 2 are also both plated with an anti-reflection film. In this way, the light is converged after passing through the second lens 2, and then enters the first lens 1. The first lens 1 is also a converging positive lens. After passing through the first lens 1, the light enters the human eye 5 for imaging. There is no optical path folding in the entire optical system, and the surfaces of each lens are plated with an anti-reflection film, so the light transmission efficiency is high.

In some examples of the present disclosure, a first spacing $T_1$ is provided between the first lens and the second lens, and the first spacing $T_1$ is set to 0.2 mm≤$T_1$≤1 mm.

In some examples of the present disclosure, a second spacing $T_2$ is provided between the second lens and the third lens, and the second spacing $T_2$ is set to 1 mm≤$T_2$≤3 mm.

In the embodiment of the present disclosure, a narrow air gap is provided between the first lens 1 and the second lens 2; at the same time, a narrow air gap is also provided between the second lens 2 and the third lens 3. In the present disclosure, by optimizing the air gaps between the lenses, it facilitates realizing the miniaturization of the entire optical system.

In addition, if the optical system is also provided with a display screen 4, after the spacings between lenses in the lens group are reasonably arranged, the value of the spacing between the third lens 3 and the display screen 4 should also be considered.

The third lens 3 is arranged on the side close to the display screen 4.

For example, a third spacing $T_3$ is provided between the third lens 3 and the display screen 4.

Optionally, the third spacing $T_3$ is set to 5 mm$\leq T_3 \leq$15 mm.

In some examples of the present disclosure, the effective focal length $f_1$ of the first lens 1 is 30 mm$\leq f_1 \leq$40 mm;

the effective focal length $f_2$ of the second lens 2 is 40 mm$\leq f_2 \leq$460 mm;

the effective focal length $f_3$ of the third lens 3 is 65 mm$\leq f_3 \leq$115 mm.

In the solution of the present disclosure, the first lens 1, the second lens 2 and the third lens 3 all have Fresnel surfaces, which can provide a large focal power and make the optical system have a short focus.

The present disclosure provides a short-focus optical system. There is no optical path folding in the entire optical system. It is a direct transmission optical system that can achieve high-resolution imaging.

In some examples of the present disclosure, the thickness $h_1$ at the center of the first lens 1 is 2 mm$\leq h_1 \leq$4 mm; the thickness $h_2$ at the center of the second lens 2 is 3 mm$\leq h_2 \leq$5 mm; the thickness $h_3$ at the center of the third lens 3 is 2 mm$\leq h_3 \leq$4 mm.

The thickness of each lens will not be too thick, which is also conducive to reducing the weight of the entire optical path structure.

In some examples of the present disclosure, the first lens 1 and the second lens 2 are made of COP materials, OKP materials, EP materials or PMMA materials.

(1) A 100 degree field of view is realized in 1.4 inch display screen 4.

(2) The distortion is less than 38.3%, and the field curvature is less than 1.1 mm.

(3) The chromatic aberration is less than 26 μm. The virtual image distance is 1500 mm.

(4) The spot size of the optical system is less than 73 μm, realizing clear imaging in the visible light band (450 nm to 630 nm). The effective focal length of the entire optical system is 17 mm.

First Embodiment

The first embodiment provides an optical system, and the structure parameters in the optical system are shown in Table 1.

Table 1 lists the optical surface numbers (Surface) that are numbered sequentially from the human eye 5 (diaphragm) to the display screen 4, the curvature (C) of each optical surface on the optical axis, the distance (T) between each optical surface and the next optical surface on the optical axis from the human eye 5 (diaphragm) to the display screen 4, and even aspheric coefficients $\alpha_2$, $\alpha_3$, $\alpha_4$.

The aspheric coefficients can satisfy the following equation:

$$z = \frac{CY^2}{1 + \sqrt{1 - (1+k)C^2 Y^2}} + \sum_{i=2}^{N} \alpha_i Y^{2i} \tag{1}$$

In equation (1), z is a coordinate along the optical axis, Y is a radial coordinate in the unit of lens length, C is the curvature (1/R), and K is the conic constant, $\alpha_i$ is the coefficient of each high-order term, and 2i is the order of aspheric coefficient. In the solution of the present disclosure, considering the smoothness of the field curve, there is no high order spheric coefficients designed to be 4th order.

TABLE 1

| Surf | Type | Radius | Thick-ness | GLASS | Clear Diam | Mech Diam | Conic | 4th |
|------|------|--------|------------|-------|------------|-----------|-------|-----|
| OBJ | STANDARD | Infinity | −1500 | | 3575.261 | 3575.261 | 0 | |
| STO | STANDARD | Infinity | 12 | | 4 | 4 | 0 | |
| 2 | EVENASPH | 78.1965 | 3.000 | K26R | 34.685 | 37.308 | −10.000 | −1.0463E−05 |
| 3 | FRESNELS | −25.99979 | 0.540 | | 37.308 | 37.308 | −0.052 | −8.3559E−06 |
| 4 | FRESNELS | 25.99979 | 3.186 | K26R | 37.692 | 37.692 | 0.040 | 1.4948E−05 |
| 5 | EVENASPH | −139.9991 | 0.500 | | 36.233 | 36.233 | −9.992 | 3.8032E−06 |
| 6 | FRESNELS | 45.1666 | 2.998 | OKP-1 | 34.997 | 34.997 | −10.000 | −7.6959E−06 |
| 7 | EVENASPH | 112.1967 | 11.921 | | 31.724 | 31.724 | 9.712 | 1.2888E−05 |
| 8 | STANDARD | Infinity | 0.450 | BK7 | 25.547 | 25.547 | 0.000 | |
| 9 | STANDARD | Infinity | 0.095 | | 25.367 | 25.547 | 0.000 | |
| IMA | STANDARD | Infinity | | | 25.139 | 25.139 | 0.000 | |

In the solution of the present disclosure, for each lens (i.e., the first lens 1, the second lens 2 and the third lens 3), in terms of material selection, based on the consideration of short-focus and chromatic aberration, the combinations of materials having high refractive indexes and high/low Abbe numbers are selected for design optimization.

The present disclosure provides a short-focus optical system. There is no optical path folding in the entire optical system. It is a direct transmission optical system that can achieve high-resolution imaging.

The following is an application example of the solution according to an embodiment of the present disclosure:

The performance of the optical system according to the first embodiment of the present disclosure is demonstrated by the following parameters.

Figure 3:
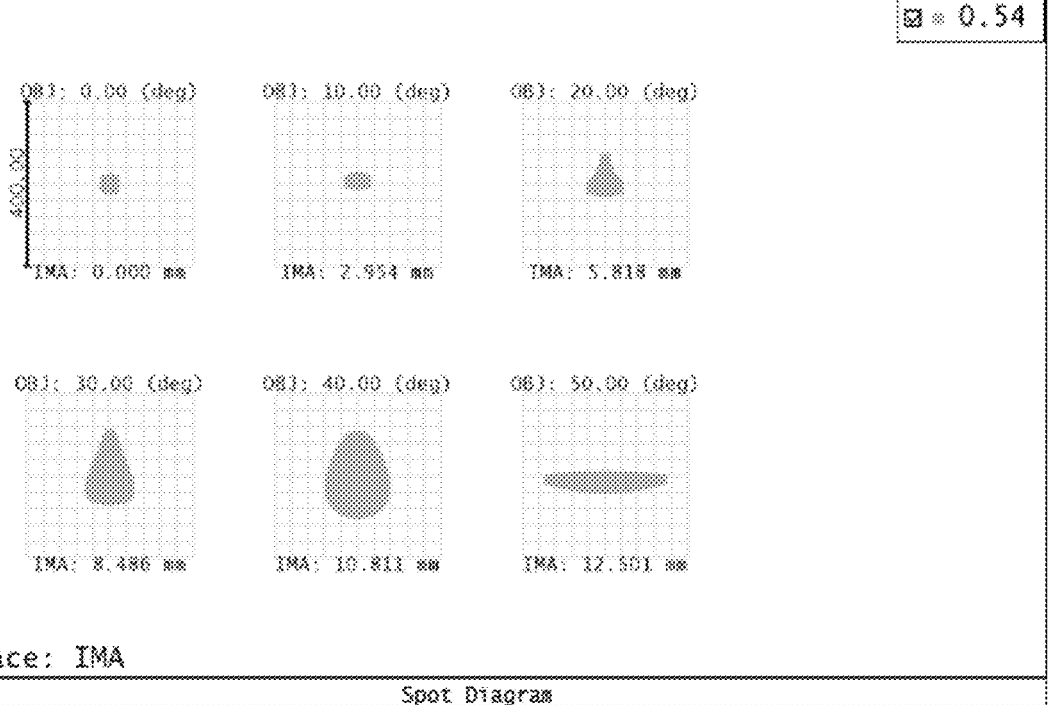
FIG. 3 is a spot diagram of an optical system according to a first embodiment of the present disclosure.

As shown in FIG. 3, the maximum spot size is at the position of the maximum field of view (1.0 F), and its maximum value is less than 72 μm.

Figure 4:
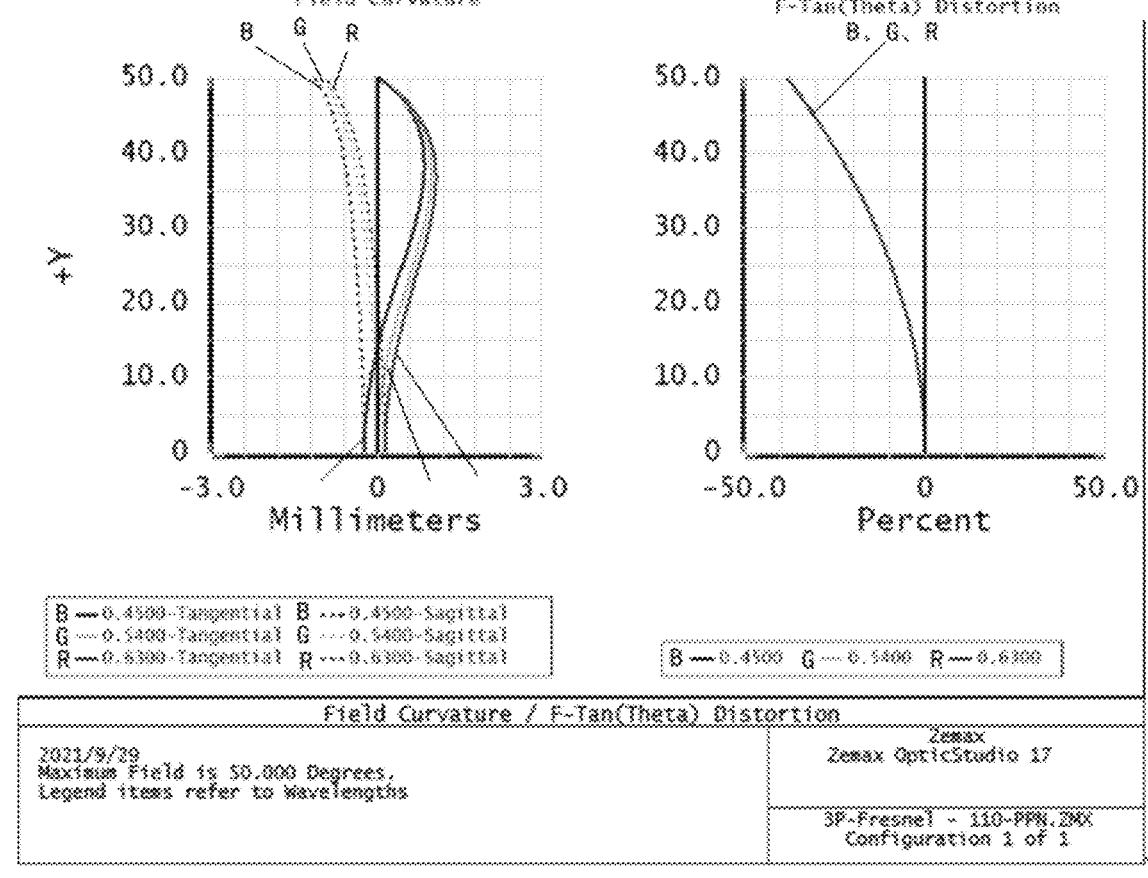
FIG. 4 is a field curvature and distortion diagram of an optical system according to the first embodiment of the present disclosure.

As shown in FIG. 4, the field curvatures of RGB wavelengths in T and S directions are less than 0.5 mm, and the maximum distortion is at the position of the maximum field of view and is less than 38.3%.

Figure 5:
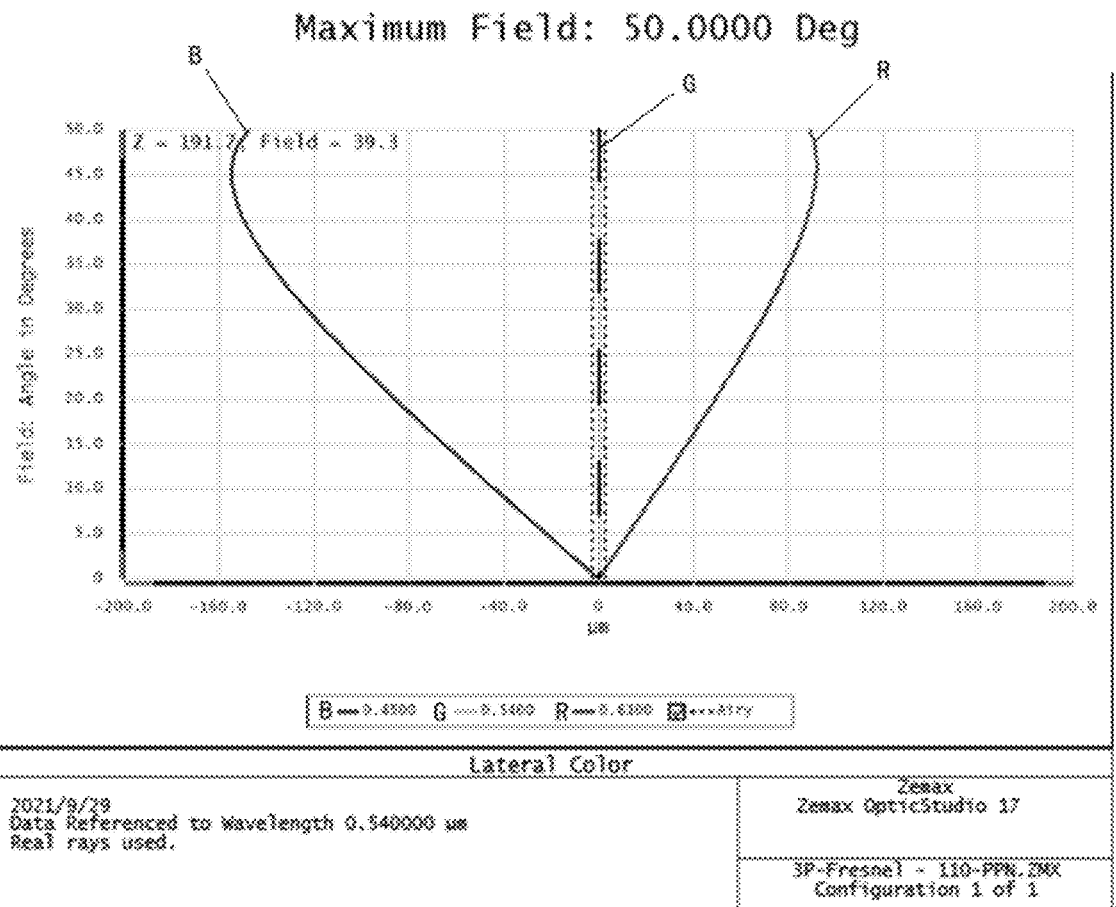
FIG. 5 is a dispersion diagram of an optical system according to the first embodiment of the present disclosure.

As shown in FIG. 5, the maximum dispersion of RGB wavelengths is at the position of the maximum field of view, the whole RGB is 450 nm to 610 nm, and the LCA is 246.8 nm.

In the optical system according to the first embodiment, the weight of the first lens 1 is 2.62 g, the weight of the second lens 2 is 2.96 g, the weight of the third lens 3 is 4.1 g, and the total weight of the three lenses is 9.68 g.

Second Embodiment

The second embodiment provides an optical system, and the structure parameters in the optical system are shown in Table 2.

Figure 6:
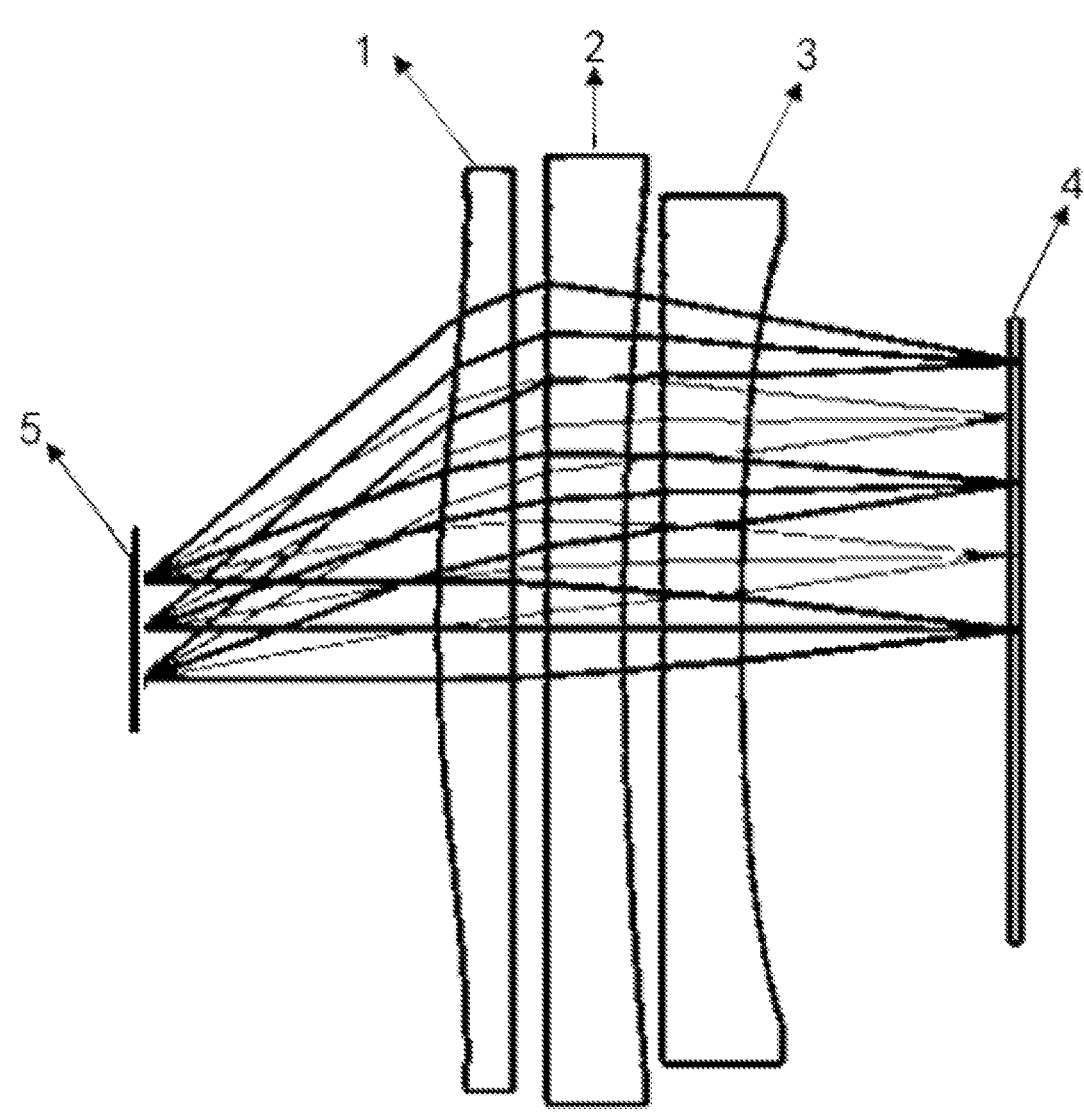
FIG. 6 is a schematic diagram of the imaging principle of an optical system according to a second embodiment of the present disclosure.

The optical system is shown in FIG. 6.

Table 2 lists the optical surface numbers (Surface) that are numbered sequentially from the human eye 5 (diaphragm) to the display screen 4, the curvature (C) of each optical surface on the optical axis, the distance (T) between each optical surface and the next optical surface on the optical axis from the human eye 5 (diaphragm) to the display screen 4, and even aspheric coefficients $\alpha_2$, $\alpha_3$, $\alpha_4$.

TABLE 2

| Surf | Type | Radius | Thick-ness | GLASS | Clear Diam | Mech Diam | Conic | 4th |
|---|---|---|---|---|---|---|---|---|
| OBJ | STANDARD | Infinity | −1500.000 | | 3575.261 | 3575.261 | 0 | |
| STO | STANDARD | Infinity | 12.000 | | 4 | 4 | 0 | |
| 2 | EVENASPH | 60.329 | 3.000 | K26R | 35.584 | 37.719 | −10.000 | −1.065E−05 |
| 3 | FRESNELS | −26.514 | 1.490 | | 37.719 | 37.719 | −0.214 | −9.276E−06 |
| 4 | FRESNELS | 25.999 | 3.078 | K26R | 38.786 | 38.786 | −0.013 | 1.753E−05 |
| 5 | EVENASPH | 157.466 | 1.591 | | 36.154 | 36.154 | −9.999 | −1.213E−06 |
| 6 | FRESNELS | 35.011 | 3.208 | OKP-1 | 35.448 | 35.448 | −6.893 | −9.133E−06 |
| 7 | EVENASPH | 166.108 | 10.946 | | 32.233 | 32.233 | 10.000 | 1.241E−05 |
| 8 | STANDARD | Infinity | 0.450 | BK7 | 25.668 | 25.668 | 0.000 | |
| 9 | STANDARD | Infinity | 0.011 | | 25.466 | 25.668 | 0.000 | |
| IMA | STANDARD | Infinity | | | 25.258 | 25.258 | 0.000 | |

The performance of the optical system of the second embodiment of the present disclosure is demonstrated by the following parameters.

Figure 7:
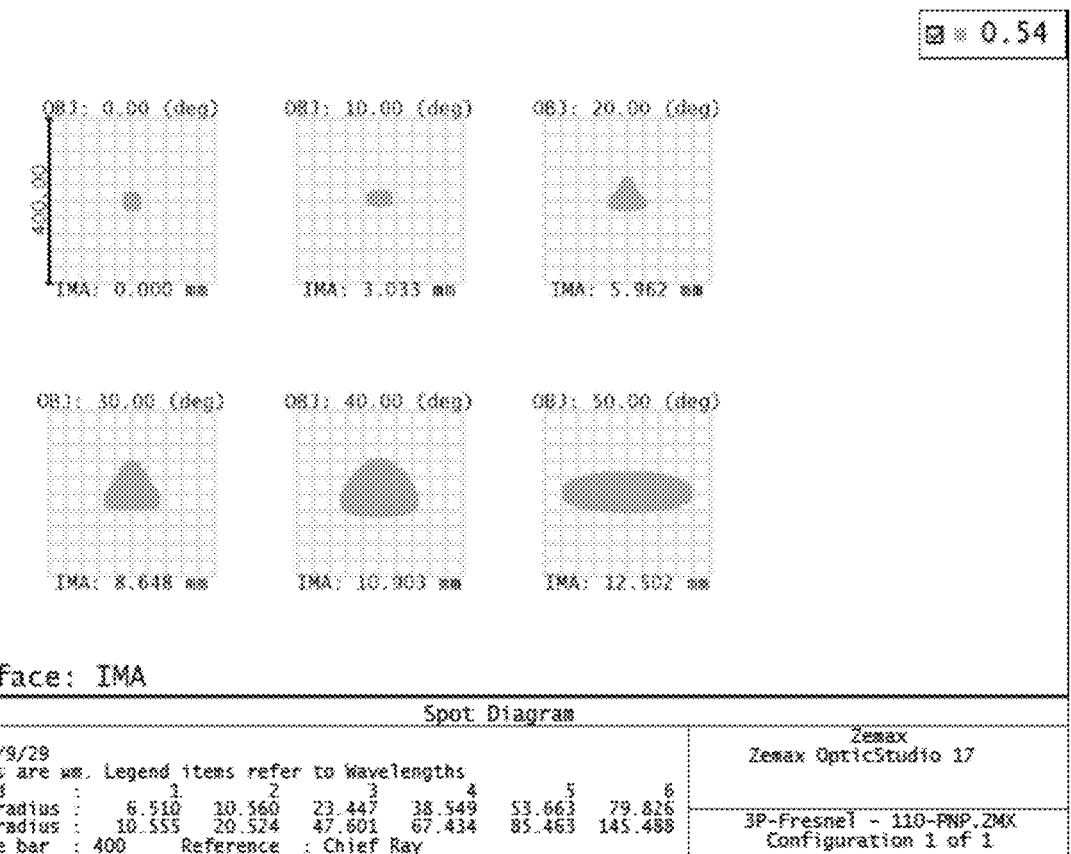
FIG. 7 is a spot diagram of an optical system according to a second embodiment of the present disclosure.

As shown in FIG. 7, the maximum spot size is at the position of the maximum field of view (1.0 F), and its maximum value is less than 80 μm.

Figure 8:
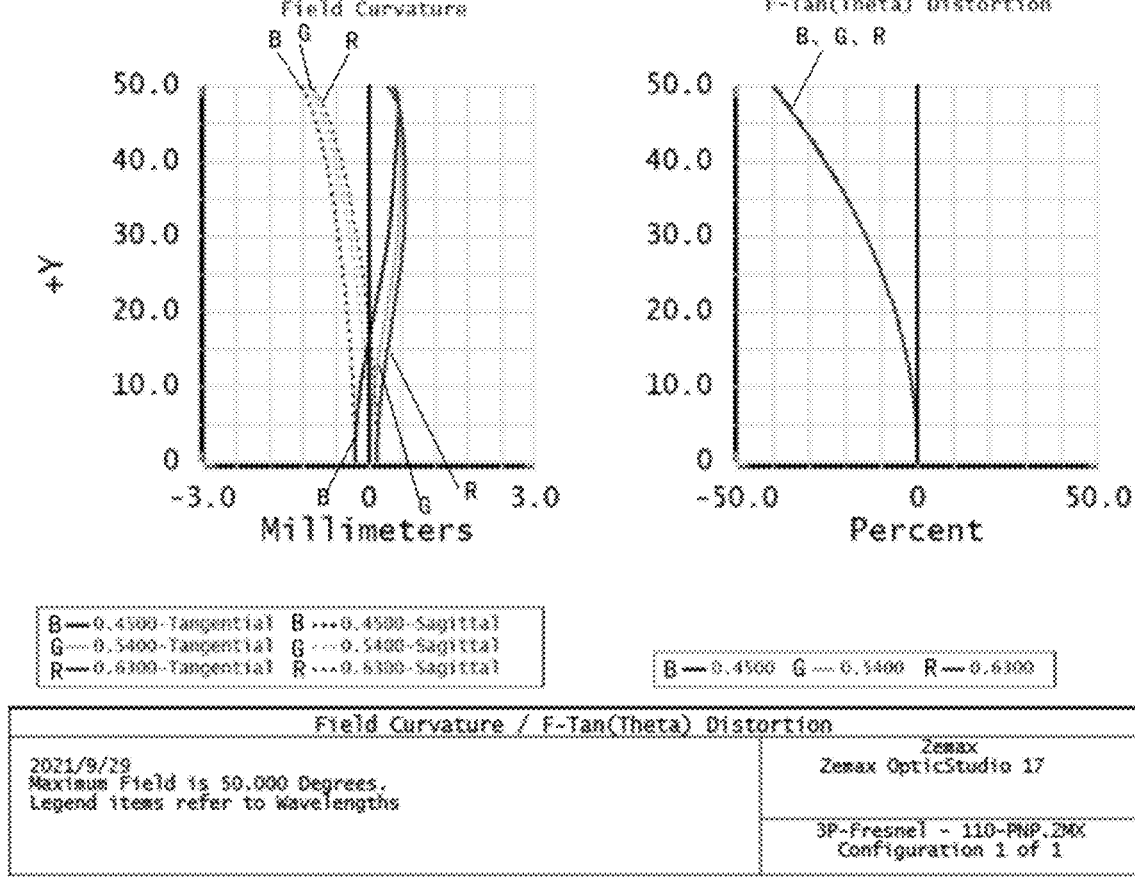
FIG. 8 is a field curvature and distortion diagram of an optical system according to the second embodiment of the present disclosure.

As shown in FIG. 8, the field curvatures of RGB wavelengths in T and S directions are less than 1.5 mm, and the maximum distortion is at the position of the maximum field of view and is less than 40%.

Figure 9:
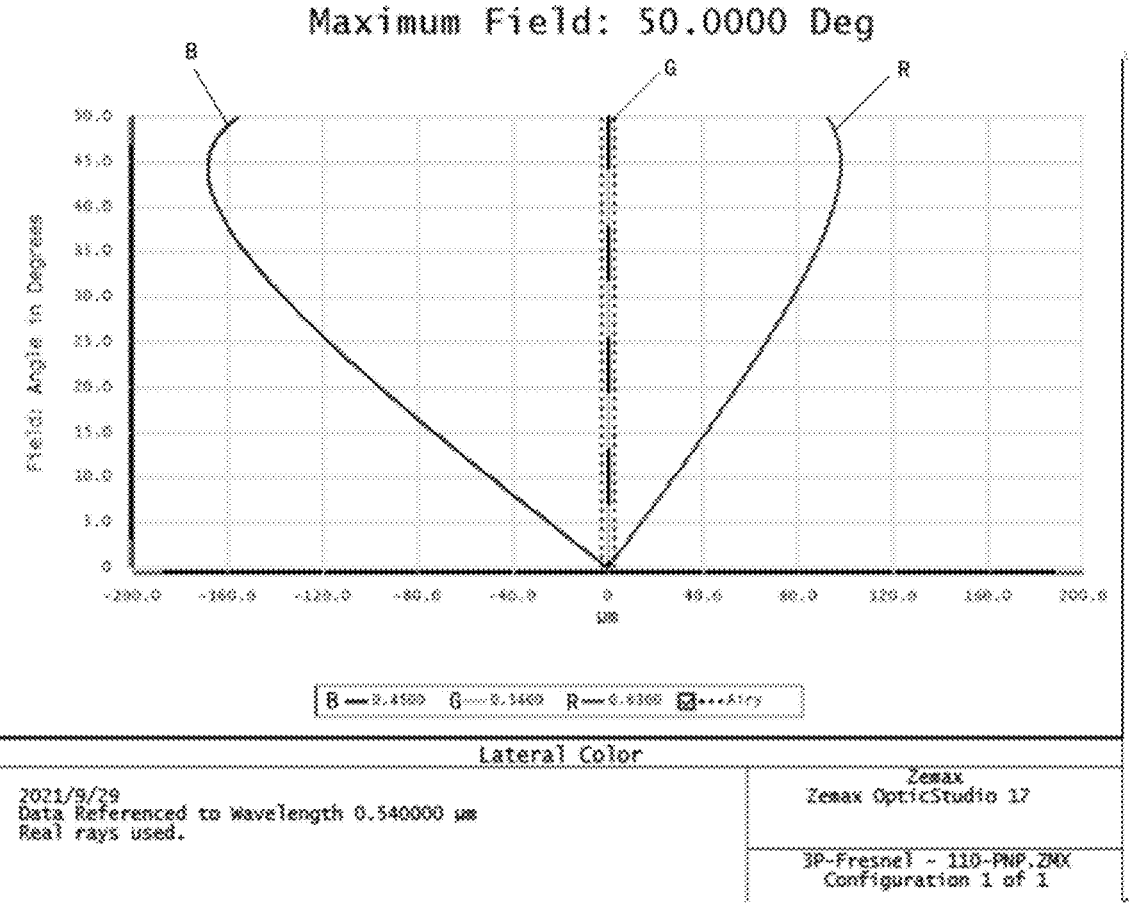
FIG. 9 is a dispersion diagram of an optical system according to the second embodiment of the present disclosure.

As shown in FIG. 9, the maximum dispersion of RGB is at the position of the maximum field of view, the whole RGB is 450 nm to 630 nm, and the LCA is 265 nm.

In the optical system according to the second embodiment, the weight of the first lens 1 is 2.39 g, the weight of the second lens 2 is 3.9 g, the weight of the third lens 3 is 4.26 g, and the total weight of the three lenses is 10.89 g.

The embodiments of the present disclosure provide a short-focus and high-resolution direct transmission optical system, which does not involve a folded optical path.

(1) In the entire optical structure, the ultra-short-focus is realized by a combination of three Fresnel mirrors;

(2) In the entire optical structure, three Fresnel surfaces are provided, and two Fresnel surfaces are arranged adjacent to each other, which facilitates reducing stray light, and reducing the aperture of the lens and further reducing the weight;

(3) The optical system is optimized by using the third lens (which is a combination of two surface shapes: concave surface+Fresnel surface) as the optical element close to the display screen 4, which facilitates realizing high resolution and low dispersion;

(4) Low dispersion of the optical path is realized by the selection of different lens materials (i.e., the selection and cooperation of materials having different refractive indexes and Abbe numbers).

According to another aspect of the present disclosure, a head mounted display is provided.

The head mounted display comprises an optical system as described above.

The head mounted display is, for example, a VR device.

The description of the above embodiments focuses on the differences between various embodiments. As long as the different optimized features between the embodiments are not contradictory to each other, they can be combined to form a better embodiment, which will not be repeated herein for simplicity of the description.

Although some specific embodiments of the present disclosure have been described in detail by examples, those skilled in the art should understand that the above examples are only for illustration, not for limiting the scope of the present disclosure. Those skilled in the art should understand that the above embodiments can be modified without departing from the scope and spirit of the present disclosure. The scope of the present disclosure is defined by the appended claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An optical system, comprising:

a third lens (3), a second lens (2) and a first lens (1) arranged successively along a propagation direction of incident light;

wherein there are three Fresnel surfaces in the optical system, and two of the Fresnel surfaces are arranged adjacent to each other;

the third lens (3) has a positive focal power;

a field of view of the optical system is ≥100 degrees;

an effective focal length f1 of the first lens (1) is 30 mm≤f1≤40 mm;

an effective focal length f2 of the second lens (2) is 40 mm≤f2≤460 mm; and an effective focal length f3 of the third lens (3) is 65 mm≤f3≤115 mm.

2. The optical system according to claim 1, wherein the first lens (1) and the second lens (2) both have positive focal powers, and the first lens (1), the second lens (2) and the third lens (3) are located on a same optical axis.

3. A head mounted display comprising the optical system according to claim 2.

4. The optical system according to claim 1, wherein two adjacent surfaces of the first lens (1) and the second lens (2) are Fresnel surfaces.

5. The optical system according to claim 4, wherein the first lens (1) comprises a first surface (11) and a second surface (12), and the second lens (2) comprises a third surface (21) and a fourth surface (22);

the second surface (12) and the third surface (21) are adjacent to each other and are both set as Fresnel surfaces; and the first surface (11) and the fourth surface (22) are both aspherical surfaces.

6. A head mounted display comprising the optical system according to claim 5.

7. A head mounted display comprising the optical system according to claim 4.

8. The optical system according to claim 1, wherein the third lens (3) comprises a fifth surface (31) and a sixth surface (32);

one of the fifth surface (31) and the sixth surface (32) is a Fresnel surface, and the other of the fifth surface (31) and the sixth surface (32) is an aspherical surface; and the Fresnel surface of the third lens (3) and the fourth surface (22) of the second lens (2) are arranged adjacent to each other.

9. A head mounted display comprising the optical system according to claim 8.

10. The optical system according to claim 1, wherein a first spacing (T1) is provided between the first lens (1) and the second lens (2), and the first spacing (T1) is set to 0.2 mm≤T1≤1 mm.

11. A head mounted display comprising the optical system according to claim 10.

12. The optical system according to claim 1, wherein a second spacing (T2) is provided between the second lens (2) and the third lens (3), and the second spacing (T2) is set to 1 mm≤T2≤3 mm.

13. A head mounted display comprising the optical system according to claim 12.

14. The optical system according to claim 1, wherein the first lens (1), the second lens (2) and the third lens (3) are made of COP materials, OKP materials, EP materials or PMMA materials.

15. A head mounted display comprising the optical system according to claim 14.

16. A head mounted display comprising the optical system according to claim 1.

17. A head mounted display comprising the optical system according to claim 1.

\* \* \* \* \*